(12) United States Patent
Rowitsch et al.

(10) Patent No.: US 11,608,456 B2
(45) Date of Patent: Mar. 21, 2023

(54) SPRAYABLE WATER-BASED ADHESIVE

(71) Applicant: HENKEL AG & CO., KGAA, Duesseldorf (DE)

(72) Inventors: Robert W. Rowitsch, Springville, NY (US); Jeffrey Cash, Travelers Rest, SC (US); Michael Maue, Buffalo, NY (US); Daniel J. Lovullo, Eden, NY (US); Brian J. Stachowski, Lackawanna, NY (US); Michael Kasprzak, Lackawanna, NY (US); Richard W. Johnston, Ontario (CA)

(73) Assignee: HENKEL AG & CO., KGaA, Duesseldorf (DE)

( * ) Notice: Subject to any disclaimer, the term of this patent is extended or adjusted under 35 U.S.C. 154(b) by 964 days.

(21) Appl. No.: 16/387,248

(22) Filed: Apr. 17, 2019

(65) Prior Publication Data
US 2019/0241776 A1    Aug. 8, 2019

Related U.S. Application Data

(63) Continuation of application No. 14/138,366, filed on Dec. 23, 2013, now abandoned, which is a continuation of application No. 11/690,497, filed on Mar. 23, 2007, now abandoned.

(60) Provisional application No. 60/785,559, filed on Mar. 24, 2006.

(51) Int. Cl.
| C09J 11/08 | (2006.01) |
| C09J 5/00 | (2006.01) |
| C09J 111/00 | (2006.01) |
| C09J 147/00 | (2006.01) |
| C08L 33/00 | (2006.01) |
| C08L 11/00 | (2006.01) |
| C08L 11/02 | (2006.01) |
| C08K 3/013 | (2018.01) |
| B32B 37/12 | (2006.01) |

(52) U.S. Cl.
CPC ............ *C09J 11/08* (2013.01); *C09J 5/00* (2013.01); *C09J 111/00* (2013.01); *C09J 147/00* (2013.01); *B32B 2037/1276* (2013.01); *C08K 3/013* (2018.01); *C08L 11/00* (2013.01); *C08L 11/02* (2013.01); *C08L 33/00* (2013.01); *C08L 2666/04* (2013.01); *C09J 2301/412* (2020.08); *Y10T 428/2438* (2015.01); *Y10T 428/24372* (2015.01); *Y10T 428/24405* (2015.01); *Y10T 428/249972* (2015.04); *Y10T 428/25* (2015.01); *Y10T 428/251* (2015.01); *Y10T 428/254* (2015.01); *Y10T 442/699* (2015.04)

(58) Field of Classification Search
CPC ... C09J 11/08; C09J 5/00; C09J 111/00; C09J 147/00; C09J 2301/412; B32B 2037/1276; C08K 3/013; C08L 11/00; C08L 11/02; C08L 33/00; C08L 2666/04; Y10T 428/24372; Y10T 428/2438; Y10T 428/24405; Y10T 428/249972; Y10T 428/25; Y10T 428/251; Y10T 428/254; Y10T 442/699
See application file for complete search history.

(56) References Cited

U.S. PATENT DOCUMENTS

| 3,401,475 A | 9/1968 | Morehouse et al. |
| 3,615,972 A | 10/1971 | Morehouse, Jr. et al. |
| 3,864,181 A | 2/1975 | Wolinski et al. |
| 4,006,273 A | 2/1977 | Wolinski et al. |
| 4,144,372 A | 3/1979 | Beck |
| 4,411,954 A | 10/1983 | Butch, III et al. |
| 4,460,728 A | 7/1984 | Schmidt, Jr. et al. |
| 4,507,429 A | 3/1985 | Lenney |
| 4,526,577 A | 7/1985 | Schmidt, Jr. et al. |
| 4,722,943 A | 2/1988 | Melber et al. |
| 4,829,094 A | 5/1989 | Melber et al. |
| 4,843,104 A | 6/1989 | Melber et al. |
| 4,888,241 A | 12/1989 | Melber et al. |
| 4,898,892 A | 2/1990 | Melber et al. |
| 4,898,894 A | 2/1990 | Melber et al. |
| 4,908,391 A | 3/1990 | Melber et al. |
| 4,912,139 A | 3/1990 | Melber et al. |
| 5,010,120 A | 4/1991 | Sugiura |
| 5,011,862 A | 4/1991 | Melber et al. |
| 5,045,569 A | 9/1991 | Delgado |
| 5,155,138 A | 10/1992 | Lundqvist |
| 5,180,752 A | 1/1993 | Melber et al. |
| 5,264,467 A | 11/1993 | DiStefano |

(Continued)

FOREIGN PATENT DOCUMENTS

| EP | 0257984 B1 | 5/1992 |
| EP | 0792926 B1 | 6/2003 |
| WO | 03068886 A1 | 8/2003 |

OTHER PUBLICATIONS

Air Products, "Flexbond 325 Emulsion Polymer" Product Data Sheet, Apr. 29, 2013.

(Continued)

*Primary Examiner* — Angela C Scott
(74) *Attorney, Agent, or Firm* — Sun Hee Lehmann

(57) ABSTRACT

Water-based adhesive compositions are improved by the incorporation of hollow polymeric microspheres having outer surfaces coated with one or more barrier materials such as calcium carbonate particles. The adhesive compositions exhibit enhanced rheology, sprayability, drying time, tack and storage stability as compared to analogous adhesives that are not modified with coated hollow polymeric microspheres. Such compositions are useful as both contact adhesives as well as wet bonding one-way adhesives.

20 Claims, No Drawings

(56) References Cited

U.S. PATENT DOCUMENTS

| | | |
|---|---|---|
| 5,342,689 A | 8/1994 | Melber et al. |
| 5,427,851 A | 6/1995 | Mehta |
| 5,508,313 A | 4/1996 | Delgado et al. |
| 5,536,756 A | 7/1996 | Kida et al. |
| 5,542,599 A | 8/1996 | Sobol |
| 5,580,656 A | 12/1996 | Melber |
| 5,658,969 A | 8/1997 | Gerace |
| 5,824,748 A | 10/1998 | Kesti et al. |
| 5,834,526 A | 11/1998 | Wu et al. |
| 5,931,354 A | 8/1999 | Braud et al. |
| 5,942,570 A | 8/1999 | Matsukura et al. |
| 6,008,271 A | 12/1999 | Hosoda et al. |
| 6,075,078 A | 6/2000 | Braud et al. |
| 6,086,997 A | 7/2000 | Patel et al. |
| 6,211,282 B1 | 4/2001 | Yamashita et al. |
| 6,214,450 B1 | 4/2001 | Wickert et al. |
| 6,225,361 B1 | 5/2001 | Nakajima |
| 6,235,394 B1 | 5/2001 | Shimazawa et al. |
| 6,235,800 B1 | 5/2001 | Kyuno et al. |
| 6,348,960 B1 | 2/2002 | Etori et al. |
| 6,365,641 B1 | 4/2002 | Masuda et al. |
| 6,440,259 B1 | 8/2002 | Patel |
| 6,509,384 B2 | 1/2003 | Kron et al. |
| 6,881,247 B2 | 4/2005 | Batdorf |
| 6,903,143 B2 | 6/2005 | Masuda et al. |
| 6,939,432 B2 | 9/2005 | Chao et al. |
| 2002/0016406 A1 | 2/2002 | Chen et al. |
| 2003/0000394 A1 | 1/2003 | Van Duijnhoven et al. |
| 2003/0039412 A1 | 2/2003 | Rodick |
| 2004/0023012 A1 | 2/2004 | Kia et al. |
| 2004/0147663 A1 | 7/2004 | Silvers et al. |
| 2005/0080151 A1 | 4/2005 | Miki et al. |
| 2005/0282014 A1 | 12/2005 | Johnston et al. |
| 2009/0162420 A1 | 6/2009 | Klokkers et al. |

OTHER PUBLICATIONS

Komatsu, Y. Kamimura, J., Suzuki, E., and Ueki M. "Application of High Strength/Low Specific Gravity Under Body Coat for Automobile"; SAE International; International Congress & Exposition, Feb. 24-28, 1992, Detroit, Michigan.

"Dualite Microspheres"; Technical Data Package, Pierce & Stevens Corp., Feb. 1992.

Gerlach, D. "Polychloroprene—An Evergreen Product for the Formulation of Water Based Contact Adhesives," Advances in Adhesives & Sealants Technology, Paper 14, 1994.

"Dualite Hollow Composite Microspheres"; Pierce & Stevens Corp., Jun. 1989.

"Dualite Product Informaiton, MS7000"; Product Data Sheet, Pierce & Stevens Corp., Jul. 1998.

Robbins, J. "Polychloroprene Contact Adhesives"; posted Mar. 4, 2003, www.adhesivesmag.com.

"Tailor-made polymer expanders come of age"; Performance Chemicals, vol. 9, No. 5, Oct. 1994, pp. 23 and 25.

"Underbody Coatings Use Polymeric Microspheres"; Modern Paint and Coatings, Apr. 1993.

International Search Report dated Aug. 13, 2007 for Application No. PCT/US2007/064742.

Written Opinion dated Aug. 13, 2007 for Application No. PCT/US2007/064742.

"Dualite in Acrylic Sealants"; UCB Chemicals, Oct. 18, 1994.

SPRAYABLE WATER-BASED ADHESIVE

CROSS-REFERENCE TO RELATED APPLICATIONS

This application is a divisional of U.S. application Ser. No. 14/138,366, filed Dec. 23, 2013, which is a continuation of U.S. application Ser. No. 11/690,497, filed Mar. 23, 2007, now abandoned, which claims priority from U.S. Provisional Application No. 60/785,559, filed Mar. 24, 2006, the entire disclosures of each of which are incorporated herein by reference for all purposes.

FIELD OF THE INVENTION

This application relates to a sprayable water-based adhesive containing a plurality of barrier material-coated polymeric hollow microspheres, to its production and to its use.

BACKGROUND OF THE INVENTION

In the past, most commercially available contact adhesives have been solvent-based, i.e., adhesives containing one or more volatile organic solvents. "Contact adhesives" are adhesives which typically are applied to the surfaces of two substrates that are to be joined together and dried to form an adhesive coating layer on the substrate surfaces, with the adhesive coating layers then brought into contact with each other under pressure to form an immediate, durable bond. Such adhesives typically comprise an elastomeric polymer dissolved in solvent, perhaps in combination with certain other components. The elastomeric polymer provides the basis for forming an effective adhesive bond upon setting of the contact adhesive.

It is usually desirable that the contact adhesive applied to the substrate surface quickly dries to form an adhesive film that is capable of providing sufficient bond strength shortly after the adhesive film layers are brought together under pressure such that the joined substrates are effectively held together and substantially resist separation during subsequent handling (e.g., after the contacting pressure is released). Fast drying (i.e., highly volatile) organic solvents have traditionally been used to formulate contact adhesives, particularly sprayable contact adhesives, since such solvents offer the advantage of short dry times, wherein the applied coating of adhesive is ready to be bonded to another coated substrate shortly after being applied so that assembly times for the bonded substrates and therefore production rates may be optimized.

However, the use of organic solvent-based contact adhesives has come under increased scrutiny in recent years because of environmental and worker exposure concerns. In addition, many organic solvents are flammable. Due to the harm that at least certain organic solvents used in such adhesives may cause after being released into the atmosphere upon drying of the adhesive, regulations on these solvent-based contact adhesives have become stricter. Although in principle it is possible to control solvent losses and emissions through the installation of ventilation and recycling systems, such systems significantly add to the cost of employing such adhesives and in certain end-use applications (such as the construction industry) it is simply not practical to do so. As a result, there has been an increasing interest in developing alternative adhesives that avoid the use of volatile organic solvents altogether. Water-based contact adhesives represent one type of adhesive that can in principle be substituted for the traditional solvent-based contact adhesives and to date have typically been formulated to include a latex or emulsion of an elastomeric polymer in water. Polychloroprene is an example of a suitable elastomeric polymer for such formulations, as described in more detail in Gerlach, "Polychloroprene—An Evergreen Product for the Formulation of Water Based Contact Adhesives", *Advances in Adhesives & Sealants Technology*, Paper 14, 1994; and U.S. Pat. Nos. 6,086,997 and 6,440,259 (each of which is incorporated herein by reference in its entirety).

However, the water-based contact adhesives developed to date have typically suffered from a number of deficiencies as compared to the conventional organic solvent-based contact adhesives. For example, the solvent-based contact adhesives have good storage and shelf stability, whereas the water-based contact adhesives have a tendency to coagulate over time. Such coagulation substantially interferes with the ease with which the adhesive can be applied to a substrate surface, especially by spraying. Although stabilizers (such as emulsifying agents) are commonly used to increase the stability of the elastomeric polymer emulsion, the water-based contact adhesives still tend to have a relatively short shelf life, particularly at elevated temperatures. Also, the water-based contact adhesives are more difficult to apply to substrate surfaces by spraying than the solvent-based contact adhesives, as the spray pattern observed is generally far inferior. The use of water as a contact adhesive carrier instead of an organic solvent additionally tends to greatly decrease both the drying rate and the degree of tack attained in the dried adhesive film. Such deficiencies have made it difficult for water-based contact adhesives to fully replace solvent-based contact adhesives, even though significant environmental, health and safety advantages could thereby be achieved. Further improvements in water-based contact adhesive formulations are therefore highly desired by the adhesive industry as well as the end users of such adhesives.

U.S. Pat. No. 5,264,467 discloses aqueous high performance contact adhesives containing an adhesive polymer emulsion and thermoplastic hollow microspheres. The adhesive polymer can be a vinyl acetate-ethylene, acrylic, styrene-acrylic, styrene butadiene or neoprene polymer. However, there is no teaching or suggestion that microspheres having an outer coating of a bather material could be utilized. In addition, U.S. Pat. No. 5,264,467 does not mention that such contact adhesives could be applied by spraying or could be provided in sprayable form within a pressurized container.

BRIEF SUMMARY OF THE INVENTION

It has now been surprisingly discovered that the incorporation of hollow polymeric microspheres having outer surfaces coated with at least one barrier material (such as finely divided calcium carbonate particles) into a water-based adhesive composition comprising an aqueous emulsion of at least one elastomeric adhesive polymer (e.g., a chloroprene polymer) provides significant benefits as compared to analogous formulations that do not contain such coated microspheres. In particular, the storage stability/shelf life, drying rate and tack are all improved. For example, contactability of the adhesive film during the bonding phase is enhanced. Additionally, the presence of the coated microspheres unexpectedly causes the spray pattern of the water-based adhesive to widen and soften, thereby making the adhesive much easier to apply in a satisfactory manner to a substrate surface by spraying. Another surprising effect of the coated microspheres is that the bonding attributes of a water-based contact adhesive are preserved or even enhanced at loadings of up to at least about 5 percent by weight of the coated microspheres, even though the density of the adhesive is significantly reduced. The coated microspheres preferably do not contain significant amounts of free volatile organic compounds and thus do not compromise the recognized environmental and worker exposure advantages of water-based contact adhesives.

DETAILED DESCRIPTION OF CERTAIN EMBODIMENTS OF THE INVENTION

The following are among the advantages provided by at least certain embodiments of the adhesives of the present invention:
Density reduction
Reduction in applied cost
Increased storage stability (maintenance of homogeneity)
Gap filling properties
High build
Enhanced application properties
Sound deadening
Reduced thermal transfer
Increased modular strength
Reduced bonding pressures
Increased flexural strength
Vibration dampening
Improved impact/fracture resistance The reasons why such enhancements are realized are not completely understood, but it has been observed that a dried film or coating of an adhesive in accordance with the present invention generally exhibits a homogeneous dispersion of the coated hollow polymeric microspheres throughout the film or coating, wherein each individual microsphere is uniformly coated or surrounded by a matrix containing the elastomeric adhesive polymer. Water-borne adhesives in accordance with the present invention surprisingly have much higher shear strength as well as much higher bond strength at significantly lower bonding pressures as compared to unfilled adhesives (i.e., water-borne adhesives that do not contain coated hollow polymeric microspheres). Additionally, the water-borne adhesives of the present invention exhibit much better application properties than water-borne adhesives filled to the same volume with conventional solid particulate mineral fillers. For example, the viscosity of an adhesive in accordance with the invention drops into a range suitable for application by spraying, brushing, or rolling with only minimal shear energy, whereas the use of much higher shear energy often is ineffective in achieving a suitably low application viscosity in the case of a calcium carbonate-filled water-borne contact adhesive.

The adhesives of the present invention are water-based, meaning that substantial amounts of water are present in the composition. Typically, the adhesive contains at least about 30 weight percent water or at least about 40 weight percent water and the solid components of the adhesive are stably suspended in an aqueous phase. Preferably, the adhesive composition is free or essentially free of volatile organic solvents and other volatile organic compounds. For example, in preferred embodiments the adhesive comprises less than 1 weight percent or less than 0.5 weight percent or less than 0.1 weight percent or even 0 wt. % total volatile organic compounds (defined as compounds having vapor pressures equal to or greater than 0.1 mm Hg).

The water-based adhesives of the present invention are comprised of an aqueous emulsion of at least one elastomeric adhesive polymer. The elastomeric adhesive polymer may be any of the rubbery macromolecular materials generally having glass transition temperatures below room temperature (e.g., less than about 0° C. or less than about −20° C.) conventionally used, or known in the formulation of adhesives containing latex emulsions or dispersions. These materials include, but are not limited to, acrylic homopolymers and copolymers (including homopolymers and copolymers of C1-C12 alkyl acrylates and/or methacrylates, where such monomers may be copolymerized with other types of ethylenically unsaturated monomers, particularly homopolymers and copolymers having relatively low glass transition temperatures), acrylonitrile-butadiene copolymers, diene copolymers, polydimethyl butadiene, styrene-isoprene copolymers, isoprene-acrylonitrile copolymers, diene-vinyl aromatic monomer copolymers, polyvinyl acetates, ethylene-vinyl acetate copolymers, styrene-butadiene rubbers, styrene-acrylic copolymers (including styrenated acrylic resins), nitrile rubbers, polyisoprene, polybutadiene, natural rubber (including natural rubber that has been modified or graft copolymerized with ethylenically unsaturated monomers such as (meth)acrylic monomers and/or vinyl aromatic monomers), polyurethanes and the like and mixtures, hybrids or blends thereof, including functionalized derivatives thereof (e.g., carboxylated styrene-butadiene rubbers, carboxylated ethylene-vinyl acetate copolymers). The elastomeric adhesive polymer may be linear or branched, crosslinked or non-crosslinked, thermoplastic or thermoset. Methods of preparing emulsions of such polymers in water are well-known in the art. Typically, the emulsion will contain about 30% to about 70% by weight of the polymer, the balance being predominately water although small amounts of other substances such as emulsifiers, stabilizers, organic solvents and the like are often also present. The emulsified polymer will generally be present in the form of particles having an average size of from about 0.1 to about 1 microns in diameter.

In a particularly preferred embodiment of the invention, the adhesive comprises a homopolymer or copolymer of chloroprene in the form of an emulsion. The chloroprene thus may be either hompolymerized or copolymerized with one or more other ethylenically unsaturated monomers such as styrene, vinyl toluene, and other vinyl aromatic compounds, other dienes such as 2,3-dichlorobutadiene, isoprene, butadiene and the like, unsaturated carboxylic acids and esters thereof such as acrylic acid, methacrylic acid and C1-C12 alkyl esters thereof, nitriles such as acrylonitrile and methacrylonitrile, and the like. Many different types of polychloroprene are available. For example, the crystallinity of polychloroprene may vary from low to high. Also, polychloroprene may contain varying amounts of cross-linked polymer or "gel". The type of polychloroprene used can influence the ability of the adhesive composition to achieve a fast set time as well as other properties and characteristics of a water-based contact adhesive (e.g., elongation, dry tack, cohesive strength, modulus, tensile strength, hardness), as is well known in the art and as is described in Gerlach, "Polychloroprene—An Evergreen Product for the Formulation of Water Based Contact Adhesives", *Advances in Adhesives & Sealants Technology*, Paper 14, 1994. Copolymerization of chloroprene with one or more comonomers is another way in which the adhesive properties may be controlled as desired. "Carboxylated" chloroprene polymers can also be utilized.

Emulsions of chloroprene polymers and copolymers are typically prepared by emulsion polymerization, wherein free radical initiators are added to an emulsion of monomer(s) and surfactants (sometimes also referred to as emulsifiers or emulsion stabilizers) in water. Polymerization occurs through a free radical growth mechanism in which the initiator generates free radicals which react with successive monomer molecules at an active chain end. The polymer particles which form and which are initially submicron in size are stabilized by the surfactants. Commonly used surfactants for this purpose include anionic as well as nonionic surfactants. Stabilizers such as polyvinyl alcohol or rosins can also be utilized. Self-emulsification may also be possible when certain functionalized comonomers are copolymerized with the chloroprene. The molecular weight of the polymer chain can be controlled through the addition of chain transfer agents. Crystallinity can be controlled by polymerization temperature, comonomers and other variables. As explained in the aforementioned paper by Gerlach, crystallinity can be affected by the different configurations in which the chloroprene monomer can enter into the polymer backbone, including 1,4 trans, 1,4 cis, 1,2, and 3,4 configurations. The gel content is typically affected by the degree of monomer conversion achieved during polymerization. A pH control agent (e.g., a base) may be present to prevent the emulsion from coagulating prematurely.

Polychloroprene emulsions from commercial sources may be utilized in the contact adhesives of the present invention. Suitable anionic surfactant-stabilized polychloroprene emulsions, for example, include those available from DuPont Dow Elastomers under the tradenames: LATEX 750; AQUASTIK 2161 (a copolymer with 2,3-dichlorobutadiene); AQUASTIK 2540 (also a copolymer with 2,3-dichlorobutadiene); AQUASTIK 2900; AQUASTIK 2901; AQUASTIK 2920, AQUASTIK 2540, AQUASTIK 2126 and AQUASTIK 9426. Another suitable anionic surfactant-stabilized polychloroprene emulsion is DISPERCOLL C-74, available from Bayer. A suitable anionic/nonionic surfactant-stabilized polychloroprene blend emulsion is available from Bayer under the tradename DISPERCOLL C-84. A nonionically stabilized chloroprene/methacrylic acid copolymer emulsion that is suitable for use is available from DuPont Dow Elastomers under the tradename AQUASTIK 1120.

The adhesives of the present invention may contain a mixture of different elastomeric adhesive polymers such as, for example, a blend of polychloroprene and natural rubber or a blend of polychloroprene and styrene-butadiene rubber or a blend of polychloroprene and an acrylic polymer or copolymer: The adhesive may also contain, in addition to the elastomeric adhesive polymer, a different type of polymer or resin such as a non-elastomeric thermoplastic (for example, an acrylic homopolymer or copolymer having a glass transition temperature above 20 degrees C.) or a reactive resin such as an epoxy resin. In preferred embodiments of the invention, however, the adhesive is free or essentially free of reactive resins (i.e., resins capable of being cured or cross-linked by reaction with curatives or cross-linking agents).

Preferably, the adhesives of the present invention are one-part (one-component) adhesives, i.e., they do not need to be applied from two separate containers or mixed immediately prior to application or upon application to a substrate surface.

As previously noted, the sprayable water-based adhesives of the present invention contain a plurality of hollow polymeric microspheres having outer surfaces coated with at least one barrier material. Preferably, the microspheres are already expanded when combined with the other components of the adhesive, although expandable microspheres could alternatively be utilized. The outer surfaces of the hollow polymeric microspheres are preferably covered with an adherent coating of a surface barrier solid, a surface barrier liquid or a mixture of a surface barrier liquid with a surface barrier solid. Microspheres having such adherent coatings generally have free flowing properties when dried and are sometimes referred to in the art as thermally clad microspheres.

Although the size of the microspheres is not believed to be particularly critical, typically the microspheres useful in the present invention will have diameters of from about 5 microns to about 500 microns. In one embodiment, the particle size (diameter) of the microspheres is from about 20 to about 60 microns. In preferred embodiments of the invention, the composite density (i.e., the density of the coated hollow polymeric microspheres) is from about 0.06 to about 0.15 g/cm$^3$. The precise density of the microspheres selected for use is not thought to be especially important, although generally speaking the microsphere density will not be greater than about 0.04 g/cm$^3$ (as calculated in the absence of the barrier material outer coating). This microsphere density may be calculated from the measured composite density using the known weight ratios of the microspheres and surface barrier material(s) used to prepare the coated microspheres.

Methods of preparing expandable hollow polymeric microspheres are well-known in the art and are described, for example, in the following United States patents and applications, each of which is incorporated herein by reference in its entirety: U.S. Pat. Nos. 3,615,972; 3,864,181; 4,006,273; 4,044,176; 6,365,641; 6,235,800; 5,834,526; 5,155,138; 5,536,756; 6,903,143; 6,235,394; 6,509,384; and 2005-0080151. Typically, such expandable hollow polymeric microspheres comprise a hollow polymeric shell and a blowing agent such as a volatile hydrocarbon or halogenated hydrocarbon contained therein.

The preparation of hollow polymeric microspheres containing an adherent outer coating of a barrier material (also sometimes referred to as a processing aid) such as a barrier solid and/or a barrier liquid (e.g., thermally clad hollow polymeric microspheres) from such expandable hollow polymeric microspheres is also well-known in the art, as described, for example, in the following United States patents and applications, each of which is incorporated herein by reference in its entirety: U.S. Pat. Nos. 4,722,943; 4,829,094; 4,843,104; 4,888,241; 4,898,892; 4,898,894; 4,908,391; 4,912,139; 5,011,862; 5,180,752; 5,580,656; 6,225,361; 5,342,689; and 2005-0282014. As described in certain of the aforementioned patents, coating of the microspheres may be carried concurrently or sequentially in coordination with drying and expansion. However, the barrier material-coated microspheres need not be dried before being incorporated into the water-based adhesives of the present invention.

Hollow polymeric microspheres can be made from a rather wide diversity of thermoplastic polymers (including crosslinked thermoplastic polymers) as well as thermoset polymers. In practice, the polymers used in commercially available microspheres are generally limited to polyvinylidene chloride homopolymers, random copolymers of vinylidene chloride and acrylonitrile, and random terpolymers of polyvinylidene chloride, acrylonitrile, and divinyl benzene. Microspheres of other materials, such as polyacrylonitrile, polyalkyl methacrylates, polystyrene, or vinyl chloride, are known, but such microspheres are not widely and generally available.

Suitable polymers for the formation of hollow polymeric microspheres for use in the present invention include materials which are effective vapor barriers to the blowing agent at expansion temperatures, and which have adequate physical properties to form self-supporting expanded microspheres.

Acrylic monomers useful in forming the thermoplastic polymers in the manufacture of microspheres useful in the present invention include acrylonitrile, methacrylonitrile, alkyl acrylates and alkyl methacrylates, including methyl methacrylate, methyl acrylate, butyl acrylate, butyl methacrylate, isobutyl methacrylate, stearyl methacrylate, and other related acrylic monomers such as 1,3-butylene dimethacrylate, allyl methacrylate, trimethylolpropane trimethacrylate, trimethylolpropane triacrylate, 1,4-butanediol dimethacrylate, 1,3-butanediol dimethacrylate, isobornyl methacrylate, dimethylamino ethyl methacrylate, hydroxyethyl methacrylate, hydroxypropyl methacrylate, diurethane dimethacrylate, and ethylene glycol dimethacrylate. Other, non-acrylic monomers such as, for example, styrene, divinyl benzene, vinylidene chloride and the like, may be included in the copolymer, typically in minor proportions.

The monomers used to prepare the thermoplastic may comprise multifunctional monomers which are capable of introducing crosslinking. Such monomers include two or more carbon-carbon double bonds per molecule which are capable of undergoing addition polymerization with the other monomers. Suitable multifunctional monomers include divinyl benzene, di(meth)acrylates, tri(meth)acrylates, allyl (meth)acrylates, and the like. If present, such multifunctional monomers preferably comprise from about 0.1 to about 1 weight percent or from about 0.2 to about 0.5 weight percent of the total amount of monomer. In one embodiment, the thermoplastic is a terpolymer of acrylonitrile, vinylidene chloride and a minor proportion (normally less than 5% by weight) of divinyl benzene. Microspheres comprised of this preferred terpolymer are commercially available from Sovereign Specialty Chemicals (now part of Henkel Corporation).

In another embodiment, the thermoplastic is a copolymer containing 0-80% by weight vinylidene chloride, 0-75% by weight acrylonitrile, and 0-70% by weight methyl methacrylate, wherein at least two of these monomers are utilized. In still another embodiment, the thermoplastic is prepared by copolymerization of 0-55% by weight vinylidene chloride, 40-75% by weight acrylonitrile, and 0-50% by weight methyl methacrylate, with at least two of such monomers being employed. For example, the thermoplastic may be a methyl methacrylate-acrylonitrile copolymer, a vinylidene chloride-acrylonitrile copolymer or a vinylidene chloride-acrylonitrile-methyl methacrylate copolymer.

In one preferred embodiment of the invention, the hollow polymeric microspheres are thermally clad with an outer adherent coating of at least one solid particulate material selected from the group consisting of pigments, reinforcing fillers, and reinforcing fibers, such as those conventionally used in polymer formulations. For example, talc, calcium carbonate (including colloidal calcium carbonate), barium sulfate, alumina (particularly alumina tri-hydrate), silica, titanium dioxide, zinc oxide, and the like may be employed. Other materials of interest include spherical or hollow beads of ceramics, quartz, glass or polytetrafluoroethylene, or the like. Among the fibrous materials of interest are glass fibers, cotton flock, polyamide fibers, particularly aromatic polyamide fibers, carbon and graphite fibers, metallic fibers, ceramic fibers, and the like. Conductive surface barrier coatings, such as conductive carbon, copper or steel fibers, and organic fibers with conductive coatings of copper or silver or the like are also of particular use. The solid barrier material (solid processing aid) typically is relatively small in size, i.e., is a finely divided solid. The particle size is not believed to be especially critical, but generally will be smaller on average than the average particle size of the hollow polymeric microspheres on which it is coated. For example, the barrier material may have an average particle size of at least about 0.01 microns or about 0.1 microns and not greater than about 10 microns or about 5 microns. The particles may be regular or irregular in shape, e.g., spherical, rod-like, fibrous, platelet, and so forth. In certain embodiments, at least a portion of the particulate solid barrier material is embedded in and/or bound to the outer surfaces of the microspheres.

Barrier material-coated hollow polymeric microspheres suitable for use in the present invention are available from commercial sources, including the expanded microspheres sold under the DUALITE brand name by Sovereign Specialty Chemicals (now part of Henkel Corporation). Specific illustrative microspheres that can be used include, for example, DUALITE MS7000.

Although the precise concentration of the coated hollow polymeric microspheres in the water-based adhesive is not believed to be particularly critical, typically at least about 0.2 or at least about 0.5 percent by weight (calculated on a dry basis) coated microspheres are utilized. Typically, the coated microsphere concentration is not greater than about 10 percent by weight or not greater than about 6 percent by weight.

In certain embodiments of the invention, the water-based adhesive will advantageously contain from about 20 to about 60 volume % (e.g., from about 25 to about 55 volume % or from about 30 to about 50 volume %) coated hollow polymeric microspheres.

The adhesive according to the present invention may additionally comprise one or more of the following: antioxidants (e.g., hindered phenols), defoamers, wetting agents or surfactants (e.g., non-ionic surfactants), fungicides, blowing agents, chelating or sequestering agents (e.g., sodium silicate, ethylene diamine salts, phosphates), preservatives, dispersants, biocides, stabilizers, accelerators, crosslinking agents and curing agents (e.g., thiocarbanilide, butyl zimate, or amines, although in preferred embodiments the adhesive is free or essentially free of crosslinking agents and curing agents), sulfur, tackifying resins (e.g., coumarone-indene resins, polyterpenes, terpene phenolic resins, resin esters, hydrocarbon resins, rosin acids), UV and ozone screening agents (e.g., carbon black, red iron oxide, waxes, fatty oils, antiozonants), fillers (e.g., clay, calcium carbonate, feldspar, hydrated alumina), processing oils, corrosion inhibitors (e.g., potassium or sodium nitrite), pigments (carbon black, red iron oxide, black iron oxide), plasticizers (e.g., esters such as phthalate and benzoate esters such as dioctyl phthalate, diethylene glycol dibenzoate, dipropylene glycol dibenzoate, oils such as hydrocarbon oils, glycols such as diethylene glycol), melamine formaldehyde resins, adhesion promoters/coupling agents, viscosity modifiers or thickeners (e.g., acrylates, cellulose derivatives, polyurethane based thickeners, caseinates, clays, silica gel), acid acceptors (e.g., metal oxides such as zinc oxide), internal coagulants (e.g., amino acids such as glycine), humectants (e.g., glycerin, diethylene glycol, propylene glycol and other polyalcohols), pH adjustment agents (e.g., bases such as alkali metal hydroxides and amines, acids such as citric, boric or formic acid), flame retardants (e.g., hydrated alumina, antimony trioxide, zinc borate, chlorinated or brominated paraffin waxes), mechanical stabilizers (e.g., caseinates), and/or rheology improvers. Preferably, the adhesive is essentially free or entirely free of any volatile organic compounds (VOCs).

Any tackifier known in the art that can yield the properties desired in the adhesive composition can be utilized. Generally, the tackifier can be selected from the group consisting of rosins, rosin derivatives, rosin esters, hydrocarbon resins, synthetic polyterpenes, natural terpenes, and the like. More particularly, useful tackifying resins include, but are not limited to, (1) natural and modified rosins and the hydrogenated derivatives thereof; (2) esters of natural and modified rosins and the hydrogenated derivatives thereof; (3) polyterpene resins and hydrogenated polyterpene resins; (4) aliphatic petroleum hydrocarbon resins and the hydrogenated derivatives thereof; (5) aromatic hydrocarbon resins and the hydrogenated derivatives thereof; and (6) alicyclic petroleum hydrocarbon resins and the hydrogenated derivatives thereof. Mixtures of two or more of the above-described tackifiers may be required for some formulations. Natural and modified rosins and the hydrogenated derivatives thereof include, but are not limited to, gum rosins, wood rosins, tall-oil rosins, distilled rosins, hydrogenated rosin, dimerized rosins, and polymerized rosins. Suitable examples of esters of natural and modified rosins and the hydrogenated derivatives thereof include, but are not limited to, the glycerol esters of rosins, the glycerol esters of hydrogenated rosins, the glycerol esters of polymerized rosins, and the pentaerythritol esters of hydrogenated rosins. Polyterpene resins generally result from the polymerization of terpene hydrocarbons, such as the bicyclic monoterpene known as pinene, in the presence of Friedel-Crafts catalysts at moderately low temperatures. Aliphatic petroleum hydrocarbon resins and hydrogenated derivatives thereof are generally produced from the polymerization of monomers consisting of primarily olefins and diolefins. Aromatic hydrocarbon resins include, for example, hydrocarbon resins derived from at least one alkyl aromatic monomer, such as, for example, styrene, alpha-methyl styrene and vinyl toluene, and the hydrogenated derivatives thereof. The alkyl aromatic monomers can be obtained from petroleum distillate fractions or from non-petroleum feedstocks, such as, for example, feedstocks produced from phenol conversion processes. An alicyclic petroleum hydrocarbon resin can be produced utilizing a hydrocarbon mixture comprising dicyclopentadiene as the monomer.

The optional additives mentioned above may, for convenience, be utilized in the form of aqueous dispersions or emulsions. That is, the additive may be dispersed or emulsified in water at the time it is combined with the other components of the adhesive. For example, the tackifier may be added as a tackifier dispersion in water. Examples of tackifier dispersions that can be added to the adhesive composition are disclosed in U.S. Pat. Nos. 4,526,577, 4,460,728 and 4,411,954, all of which are herein incorporated by reference in their entirety.

Illustrative adhesives in accordance with the present invention which are particularly suitable for application by spraying may, for example, comprise water and:

| | |
|---|---|
| Polychloroprene[1] | 25-40 or 30-35 wt. % |
| Antioxidant(s) | 0.5-5 or 1-3 wt. % |
| Acid Acceptor(s) | 0.5-5 or 1-3 wt. % |
| Plasticizer(s) | 1-6 or 2-4 wt. % |
| Tackifier(s) | 10-20 or 12-18 wt. % |
| Pigment(s) | 0-1 or 0.01-0.5 wt. % |
| Coated Microspheres | 0.5-6 or 1-3 wt. % |

[1]Added as emulsion in water (typically, ca. 40-60 wt. % polymer; concentrations listed are based on dry weight of polymer).

The weight percent concentration ranges stated are based on the dry (solids) weight of each component. Preferably, the polychloroprene, antioxidants, acid acceptors, tackifiers and pigment are supplied to the adhesive composition in the form of aqueous dispersions or emulsions (typically, containing about 25 to about 60 weight % solids). Such adhesives may additionally contain relatively minor amounts (e.g., less than about 0.1 weight %) of one or more other additives such as surfactants, solvents (e.g., glycol ethers), pH control agents (e.g., alkali metal hydroxide), and the like. In certain embodiments, the components of the water-based adhesive composition are selected so as to provide a viscosity at 20 degrees C. of not more than about 3000 Pa·s at a shear stress of 10 Pa and of not more than about 200 Pa·s (alternatively, not more than about 100 Pa·s) at a shear stress of 40 Pa.

The adhesive compositions of the present invention can be prepared by mixing the selected ingredients together at approximately room temperature. Conventional, low shear mixing equipment can be used. For convenience, certain of the ingredients (in particular, the elastomeric adhesive polymer) may be added to or combined into the mixture in an already emulsified or dispersed state, for example as an emulsion of about 50 to about 60 weight percent of the polymer in water).

The adhesives of the present invention may be employed in any of the applications and end uses where water-based contact adhesives are conventionally utilized. Typical applications include, but not limited to, adhering carpet, carpet padding, ceramic tiles, resilient tiles, resilient sheet goods, wooden planks and boards, wooden tiles, synthetic flooring material, and other such materials that are used for flooring purposes to flooring surfaces or other suitable substrates comprised of wood, concrete, or the like. The adhesive may also, for example, be utilized in general construction, curtain wall construction, high pressure lamination, film and foil lamination, tapes, do-it-yourself products, hobbies and crafts, manufacturing, boat construction, mobile home construction, vehicle assembly, wall covering installation, edge banding, furniture construction, countertop construction (e.g., lamination of a decorative plastic veneer to a wood or other cellulosic core or support material), container labeling, and so forth.

The adhesives of the present invention can generally be used in methods for contact bonding substrates together, wherein the water-based adhesive is applied in wet form to surfaces of a first substrate and a second surface, the adhesive is permitted to dry at least partially to form an adhesive film layer on each substrate surface, and the substrate surfaces having the adhesive film layers thereon brought together to form an adhesive bond joining the two substrates together. Preferably, the substrates are pressed and held together for a time sufficient to form a secure bond. After drying and just prior to contact bonding, the adhesive film layer can, if desired, be further activated by heating to a temperature above ambient temperature. Such an activation method may be particularly desirable where the elastomeric polymer has a high degree of crystallinity, as heating helps to reduce crystallinity and provide the adhesive film with enhanced grab.

The adhesives of the present invention can, in at least certain embodiments, also be used as wet bonding one-way adhesives, where the adhesive is applied to the surface of only one substrate before two substrates are joined together.

The film of adhesive on the substrate surface may be continuous or discontinuous. The coating weight of adhesive used will vary considerably depending upon the substrates as well as other factors, but typically will be from about 1 to about 250 g/m² or about 10 to about 125 g/m².

Substrates capable of being bonded to each other using the adhesives of the present invention include, but are not limited to, plastic (including foamed plastics, solid plastics, thermoplastic plastics, as well as thermoset plastics and both flexible and rigid foams), wood (including consolidated or composite wood products such as plywood and particle board), metal, rubbers (elastomers, both thermoplastic as well as thermoset), glass, ceramics, paper (& other cellulosic substrates), fabric (textiles, including natural as well as synthetic textiles in woven or non-woven form), plasterboard, fibers, leather, concrete, rock (e.g., marble or granite), sheet rock, and the like. The substrates bonded to each other may be the same as or different from each other. In certain embodiments, at least one of the substrates that are bonded together is relatively thin and flat; in such cases, the resulting composite is often referred to in the art as a laminate or laminated structure. For example, the present adhesives are useful in laminating thin plastic laminates to the edges and or sides of wood-containing substrates to provide components for countertops, furniture, and the like. However, the adhesives of the present invention can also be utilized to join together many other types of substrates.

In one embodiment of the invention, the water-based adhesive may be formulated to provide a fast-breaking adhesive for bonding of porous substrates such as open-cell foams. In such a formulation, the components are selected so that the aqueous emulsion of the elastomeric adhesive polymer(s) is marginally stable under storage conditions but breaks when subjected to high shear (for example, when sprayed through the tip of a spray head). Breaking of the emulsion prior to or when the adhesive is applied to the porous substrate surface allows the water to be readily absorbed into the porous substrate, leaving the elastomeric adhesive polymer(s) on the porous substrate surface as a tacky adhesive layer or coating. Such a product can be employed as either a contact adhesive or as a wet bonding one-way adhesive on porous substrates and is particularly suitable for use in bonding flexible open-cell foams, such as polyurethane or natural rubber foams, in furniture and bedding applications, for example. Two porous substrates (for example, two flexible open-cell foam sheets) may be readily joined to each other in this way. Other end-use applications include, for example, foam to foam, foam to fabric, foam to plastic, foam to wood, and foam to luan. Possible advantages of using a fast-breaking adhesive of the type described herein include better green strength (as demonstrated, for example, by a foam fold test), improved spray characteristics, improved rheology, density reduction, and softer bond lines. In such fast-breaking adhesives, the use of mixtures of chloroprene polymers and acrylic polymers (for example, an acrylic homopolymer or polymer having a Tg greater than 0 degrees C., e.g., about 10 to about 30 degrees C.) has been found to be advantageous. It may be helpful to employ a surfactant stabilizer such as sodium lauryl sulfate to achieve the desired stability characteristics in the water-based adhesive, with such stabilizer preferably being added to the adhesive before addition of the coated microspheres.

A fast-breaking adhesive in accordance with the present invention may, for example, comprise water and:

| | |
|---|---|
| Acrylic Homopolymer or Copolymer[1] | 7.5-10 wt. % |
| Chloroprene Homopolymer or Copolymer[1] | 30-35 wt. % |

-continued

| | |
|---|---|
| Defoamer | 0.001-1 wt. % |
| Acid Acceptor | 1-5 wt. % |
| Acid (pH Adjusting Agent) | 0.1-5 wt. % |
| Plasticizer | 0.5-5 wt. % |
| Surfactant Stabilizer | 0.001-1 wt. % |
| Biocide/Preservative | 0.001-1 wt. % |
| Internal Coagulant | 0.001-1 wt. % |
| Thickener | 0.001-2 wt. % |
| Coated Microspheres | 0.001-5 wt. % |

[1]Added as emulsion in water (typically, ca. 40-60 wt. % polymer; concentrations listed are based on dry weight of polymer).

The water-based adhesive of the present invention may be applied to a substrate surface using any suitable method, including the methods conventionally used for water-based contact adhesives including, but not limited to, spraying, brushing, troweling, rolling, pouring, and the like. Spraying is a particularly preferred application method; suitable spray-coating equipment includes manual spray operators as well as automated spray operators. It has been observed that the sprayed droplets of a water-based adhesive in accordance with the present invention typically dry much faster and bond at much lower pressure than sprayed droplets of conventional contact adhesives. In one embodiment, the application system used for the water-based adhesive is a self-contained, portable, pressurized container, wherein the adhesive is packaged together with a propellant in the container under pressure. Preferably, the application system does not include a flammable solvent or propellant, as such materials will limit the ability to safely apply the adhesive within enclosed spaces such as buildings. Non-flammable propellants thus are preferably utilized. Suitable containers for such an application system include, but are not limited to, aerosol cans, pressure tanks, canisters, and the like (for example, the cylinders conventionally utilized for propane or refrigerant storage). Typically, such containers are fabricated of metal (e.g., steel or aluminum) but relatively rigid plastics may also be used. The materials of construction should be selected such that the portions of the container in contact with the adhesive are corrosion-resistant.

For example, the adhesive may be packaged in a cylinder designed for containing pressure that includes a discharge valve and a pressure hose attached to the cylinder by means of a threaded opening in the valve. The other end of the pressure hose is attached by means of a threaded fitting to a spray gun, which may optionally have an extension wand attached. The pressure hose and spray gun are configured to permit the adhesive to be applied to a substrate surface in a suitable spray pattern. An internal dip tube is provided within the cylinder that is attached to the discharge valve and extends from the valve to a point near the bottom of the cylinder. The dip tube has an inlet at the end near the cylinder bottom that permits the adhesive to flow into the dip tube. To operate the application system, the discharge valve is opened. The adhesive, which is under pressure from the propellant within the cylinder, is forced into the dip tube, through the discharge valve and the pressure hose and out through the spray gun, or extension wand if present. The spray gun may contain a trigger mechanism that, when activated, opens a normally-closed valve and permits the adhesive to be discharged from the application system.

What is claimed is:

1. A process for bonding a first substrate to a second substrate comprising:

a) applying a water-based adhesive composition on a surface of the first substrate, wherein the water-based adhesive composition comprises a) at least about 30 weight percent of water; b) an adhesive polymer which is a homopolymer or copolymer of chloroprene having a glass transition temperature that is less than about 0° C.; and c) about 1 weight percent to about 3 weight percent of hollow, polymeric microspheres, based on the weight of the water-based adhesive composition, wherein the microspheres are coated with at least one barrier material which provides an outer coating;

b) drying, at least partially, the water-based adhesive composition to form an adhesive film layer on the surface of the first substrate; and c) bonding the first substrate to the second substrate.

2. The process of claim 1, wherein bonding step c) comprises contacting the second substrate with the adhesive film layer on the surface of the first substrate.

3. The process of claim 2, wherein bonding step c) further comprises pressing the first and second substrates together.

4. The process of claim 2, wherein the adhesive film layer is heated above ambient temperature prior to contacting the second substrate with the adhesive film layer on the surface of the first substrate.

5. The process of claim 1, further comprising:
prior to bonding step c), applying the water-based adhesive composition on a surface of the second substrate; and
drying, at least partially, the water-based adhesive composition to form an adhesive film layer on the surface of the second substrate;
wherein the bonding comprises contacting the adhesive film layer on the surface of the second substrate with the adhesive film layer on the surface of the first substrate.

6. The process of claim 1, wherein in step a) the water-based adhesive composition is applied by spraying.

7. The process of claim 6, wherein the water-based adhesive composition is sprayed on the surface of the first substrate from a pressurized canister.

8. The process of claim 1, wherein the first and second substrates are selected from the group consisting of plastic, wood, metal, rubber, glass, ceramic, paper, fabric, plasterboard, fiber, leather, concrete, rock, and sheet rock.

9. The process of claim 1, wherein one or both of the first and second substrates are porous substrates.

10. The process of claim 1, wherein the microspheres are coated with finely divided calcium carbonate particles.

11. The process of claim 1, wherein the microspheres have a composite density of not greater than about 0.15 g/cm$^3$, as measured including the outer coating.

12. The process of claim 1, wherein the outer coating is an adherent outer coating.

13. The process of claim 1, wherein the microspheres have shells comprising at least one thermoplastic polymer.

14. The process of claim 1, wherein the microspheres have shells comprising a polymer that is a methyl methacrylate-acrylonitrile copolymer, a vinylidene chloride-acrylonitrile copolymer, or a vinylidene chloride-acrylonitrile-methyl methacrylate copolymer.

15. The process of claim 1, wherein the microspheres are pre-expanded.

16. The process of claim 1, wherein the adhesive polymer has a glass transition temperature that is less than about −20° C.

17. The process of claim 1, wherein the water-based adhesive composition further comprises at least one additive selected from the group consisting of an antioxidant, a defoamer, a wetting agent, a fungicide, a preservative, a biocide, a stabilizer, a tackifying resin, a filler, a processing oil, a corrosion inhibitor, a pigment, a plasticizer, an adhesion promoter, a viscosity modifier, an internal coagulant, a pH adjustment agent, a flame retardant, a rheology improver, and a mixture thereof.

18. The process of claim 1, wherein the microspheres have an average diameter of about 20 microns to about 60 microns.

19. The process of claim 1, wherein the water-based adhesive composition has a viscosity of less than about 300 Pas at a shear stress of 10 Pa.

20. The process of claim 1, wherein the adhesive film layer formed on the surface of the first substrate exhibits a homogeneous dispersion of the microspheres throughout the film, wherein each individual microsphere is uniformly coated or surrounded by a matrix containing the adhesive polymer.

* * * * *